UNITED STATES PATENT OFFICE 2,653,898

CURARIZING COMPOSITION

Julio C. Castillo, White Plains, and Arthur P. Phillips, New York, N. Y., assignors to Burroughs Wellcome & Co. (U. S. A.) Inc., Tuckahoe, N. Y., a corporation of New York No Drawing. Application December 23, 1949, Serial No. 134,859

6 Claims. (Cl. 167—65)

The present invention relates to new compositions having a potentiating action on the curare-like effect of succinyl choline and related substances.

It is well known from the work of Barlow, Ing, Paton and Zaimis (Nature 161, 748 (1948)) that curare-like activity is exhibited by a family of long-chain di-quaternary salts of the general formula

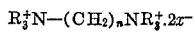

In this series maximum potency is exhibited when $n$ is 10, and derivatives of this type, notably decamethylene bis trimethylammonium bromide and iodide have proved of clinical value. On the basis of the dose required to produce muscular relaxation, these salts, sometimes known as "Ceeten," are two to ten times as potent as d-tubocurarine chloride depending on the species of animal used in the tests, but the duration of their effect is shorter. As a consequence they are not regarded as equivalent to tubocurarine for all of the uses of that substance.

It is also known from the work of Bovet (Rend. Ist. Super. Sanita 12, 1 (1949)) and others, that substances analogous to "Ceeten" but having the chain-length interrupted by ester functions have similar physiological properties. In this series, of the formula:

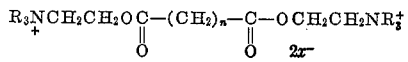

the maximum of potency is observed when $n$ is 2 in which case the cationic nitrogen atoms are separated by 10 atoms providing a chain length very close to that of "Ceeten." When, in the above formula, $R=CH_3$, the substance is conveniently named succinyl choline. This compound and its near relatives have considerable potency (close to that of "Ceeten" but even shorter in action) so that they have not been deemed to possess practical value despite the fact that their toxicity is relatively low and the relaxation they afford is qualitatively superior to that obtained with curare or "Ceeten."

The present invention is concerned with unexpected properties of a group of compounds resembling succinyl choline containing amide rather than ester functions which may be represented by the formula:

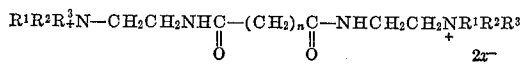

wherein $R^1$ and $R^2$ are radicals selected from the class consisting of methyl and ethyl groups and $NR^1R^2$ may be a heterocyclic radical selected from the class consisting of the piperidino, pyrrolidino and morpholino radicals, $R^3$ is a radical selected from the class consisting of the methyl, ethyl, benzyl radicals and hydrogen, $n$ is an integer from 1 to 8 and $x^-$ is an anion. In the case that $R^3$ is H, the compounds are salts of the tertiary amines, whose preparation are described in the examples. These can be administered as the free bases or as salts (corresponding to the above formula) prepared from the bases by conventional methods.

Most surprisingly the compounds of this type did not exhibit curare-like properties and their activity was at most vestigial. However, in the course of the tests that determined this fact it was discovered that these amides had an astonishing ability to prolong the action of succinyl choline and its relatives. This effect is apparent even with very small doses of the amides, while larger doses, still without curare effect, are able to convert succinyl choline into a drug with an action outlasting not only "Ceeten" but d-tubocurarine itself.

This prolongation of action does not apply to "Ceeten" or curare, both of which are unaffected by the presence of these amides. It seems possible that succinyl choline and related substances owe their brevity of action to hydrolysis by choline esterase—though this is not proved—and that the amides inhibit the action of that enzyme, but this is also speculation and there is no intention to limit the invention by any such theory.

Rather surprisingly the chain length is less critical for these tertiary and quaternary amides than for succinyl choline or "Ceeten." The malonic derivative where $n$ equals 1 is slightly less potent than the succinic derivative where $n$ equals 2 while the glutaric and adipic derivatives where $n$ equals 3 and 4 respectively are not inferior to the succinic and marked activity is manifested as high as the sebacic derivative having $n$ equal to 8.

These compounds can be administered either together with drugs of the type of succinyl choline or separately, in which case they are preferably given before the curarizing substance.

The particular anion selected, provided it is non-toxic, is of little consequenc. Commonly $x^-$ is $Cl^-$, $Br^-$, $I^-$ or $SO_4^-$ but other non-toxic anions may at times be convenient and in fact preferred for certain applications.

EXAMPLE 1

*Succinic acid bis (beta-dimethylamino-ethylamide)*

A solution of 18 g. of ethylsuccinate and 25 cc. of N,N-dimethyl ethylene diamine was refluxed 6 hrs., alcohol being allowed to distill off. On cooling the solution set to a crystalline mass which was washed with acetone. The solid weighed 16 g. (60% yield) and 3 g. more were obtained by addition of hexane to the acetone washings. Crystallization from ethyl acetate hexane mixtures afforded crystals melting at 134–135° C. and giving the correct analysis for the desired compound.

The bis methiodide was prepared from the above amide by the action of excess methyliodide in methanol. It can be crystallized from methanol and melts at 251–252° C. with decomposition. On solution in water, stirring with silver chloride and evaporation of the filtered solution in vacuo the bis methochloride is obtained.

By similar treatment of the amide base in methanol with ethyl iodide, it is converted to the bis ethiodide, of M. P. 189–190° C. which may also be transformed into the ethochloride by silver chloride.

The metho- and ethosulfates can be obtained from the above salts by shaking with silver sulfate, or, more conveniently, by direct formation from the amide base and methyl or ethyl sulfate.

Similarly the bis benzochloride is formed from the amide by the action of excess benzyl chloride, M. P. 206–207° C.

EXAMPLE 2

*Malonic acid bis (beta-dimethylaminoeth-ylamide) bis methiodide*

Sixteen g. of ethyl malonate was refluxed 23 hours with 25 cc. of N,N-dimethylethylenediamine. The product distilled at about 160° at 2 mm. pressure. With excess methyl iodide in methanol it formed the bis methiodide which melts at 200° C.

EXAMPLE 3

*Glutaric acid bis (beta-dimethyl-aminoethylamide)*

Methyl glutarate and N,N-dimethylethylene-diamine were reacted by the method of Example 1. The product, which melts at 80° C., was transformed to the bis methiodide which melts at 190–191° C. and the bis ethiodide.

EXAMPLE 4

*Adipic acid bis (beta-dimethyl-aminoethylamide)*

Methyl adipate (17.4 g.) and N,N-dimethyl-ethylenediamine (25 cc.) were reacted by the method of Example 1 yielding the desired amide which melts at 123–4° C., after crystallization from ethyl acetate.

It was transformed into its bis methiodide, M. P. 199–200° and its bis ethiodide.

EXAMPLE 5

*Suberic acid bis (beta-dimethyl-aminoethylamide)*

Methyl suberate was reacted with N,N-dimethylethylenediamine by the method of Example 1, and the resulting amide was converted into its bis methiodide and bis benzochloride.

EXAMPLE 6

*Azelaic acid bis (beta-dimethyl-aminoethylamide)*

This was prepared from methyl azelate and N,N'-dimethylethylenediamine by the method of Example 1. The amide base was transformed into its bis methosulfate by methylsulfate in methanol and into its bis ethiodide by ethyliodide.

EXAMPLE 7

*Sebacic acid bis (beta-dimethylaminoeth-ylamide) bis methiodide*

Sebacic acid bis (beta-dimethylaminoethyl-amide) was formed from methyl sebacate and N,N-dimethylethylenediamine by the method of Example 1. Its bis methiodide was obtained by the action of methyl iodide on the base in methanolic solution.

EXAMPLE 8

*Succinic acid bis (diethylaminoethylamide)*

The reaction of ethylsuccinate and N,N-diethylethylenediamine was accomplished by the method of Example 1. The product was converted into its bis methiodide, its bis ethiodide, and its bis benzochloride.

EXAMPLE 9

*Succinic acid bis (morpholinoethyl-amide) bis methiodide*

Ethyl succinate (17.5 cc.) and aminoethylmorpholine (31 cc.) were heated in a metal bath at 190–210° under reflux for 2½ hours. The product crystallized on cooling and was recrystallized from ethanol. It forms fluffy needles melting at 175–6° C. The bis methiodide melts at 221–222°.

EXAMPLE 10

*Succinic acid bis (piperidinoethyl-amide) bis methiodide*

The reaction of N-(aminoethyl) piperidine and ethyl succinate by the method of Example 9 afforded succinic acid bis (piperidinoethylamide) which was converted into its bis methiodide by the action of excess methyliodide in methanol.

EXAMPLE 11

*Glutaric acid bis (pyrrolidinoethylamide)*

Dimethyl glutarate and N-aminoethyl pyrrolidine were reacted by the method of Example 9. The product was converted into its bis methiodide, its bis ethiodide, and its bis benzochloride by the method of Example 1.

By the methods described above, the following compounds were also prepared:

Glutaric acid bis (N-diethylaminoethylamide) bis methiodide
Malonic acid bis (morpholinoethylamide) bis methiodide, M. P. 153–154° C.
Glutaric acid bis (morpholinoethylamide) bis methiodide (very hydroscopic, no useful M. P.)
Adipic acid bis (morpholinoethylamide) bis methiodide, M. P. 214–215° C.

The pyrrolidino compounds are substantially more active than the morpholino and certain of the piperidino compounds.

We claim:
1. A pharmaceutical composition containing as the active curarizing agent a compound of the general formula:

$$R_2R'NCH_2CH_2OCOCH_2CH_2COOCH_2CH_2\overset{+}{N}R_2R'$$
$$2x^-$$

wherein R and R' are radicals selected from the class consisting of the methyl and ethyl radicals and $x^-$ is the anion of a non-toxic acid, and an agent for prolonging the action of the curarizing substance which agent is selected from the class of compounds represented by the Formulae I and II (I) $R^1R^2NCH_2CH_2NHCO(CH_2)_nCONHCH_2CH_2NR^1R^2$ (II) $R^1R^2R^3\overset{+}{N}.CH_2CH_2NHCO(CH_2)_nCONHCH_2CH_2\overset{+}{N}R^1R^2R^3$
$$2x_-$$

wherein $R^1$ and $R^2$ are radicals selected from the class consisting of the methyl and ethyl radicals and —$NR^1R^2$ together is a pyrrolidino radical, $R^3$ is a radical selected from the class consisting of the methyl, ethyl, benzyl radicals and hydrogen, $x^-$ is an anion of a non-toxic acid and $n$ is an integer from 1 to 8.

2. A curarizing composition containing succinyl choline as the active curarizing substance and an agent for prolonging the action of the curarizing substance, consisting of a salt of a succinic acid bis (beta-trialkylammonium ethylamide).

3. A curarizing composition containing succinyl choline as the active curarizing substance and an agent for prolonging the action of the curarizing substance, consisting of a salt of a glutaric acid bis beta-trialkylammonium ethylamide).

4. A curarizing composition containing succinyl choline as the active curarizing substance and an agent for prolonging the action of the curarizing substance, consisting of a salt of an adipic acid bis (beta-trialkylammonium ethylamide).

5. A pharmaceutical composition consisting of succinylcholine as the active curarizing substance and as a prolonging agent a bis pyrrolidino ethyl amide of a straight chain dibasic acid having from 4 to 6 carbon atoms.

6. A pharmaceutical composition consisting of succinylcholine as the active curarizing substance and as a prolonging agent a quaternary ammonium salt of a bis pyrrolidino ethyl amide of a straight chain dibasic acid having from 4 to 6 carbon atoms.

JULIO C. CASTILLO.
ARTHUR P. PHILLIPS.

References Cited in the file of this patent

UNITED STATES PATENTS

| Number | Name | Date |
|---|---|---|
| 2,438,200 | Behr et al. | Mar. 23, 1948 |

OTHER REFERENCES

J. Pharmacy and Pharmacy and Pharmacology, July 1946, volume 1, Number 7, page VIII of ads.